Dec. 8, 1931.  M. S. JOHNSON  1,835,221
FLOOR RACK HINGE
Filed Oct. 27, 1930   2 Sheets-Sheet 1

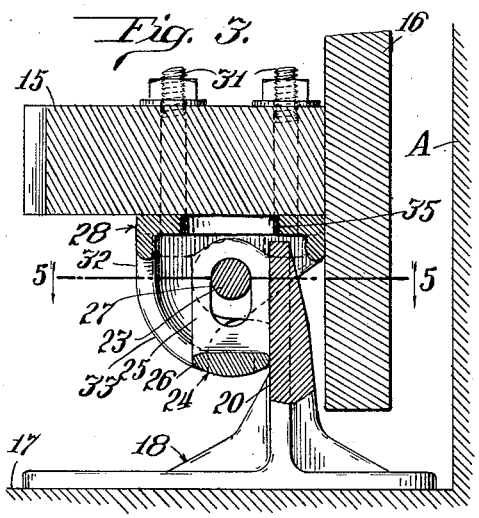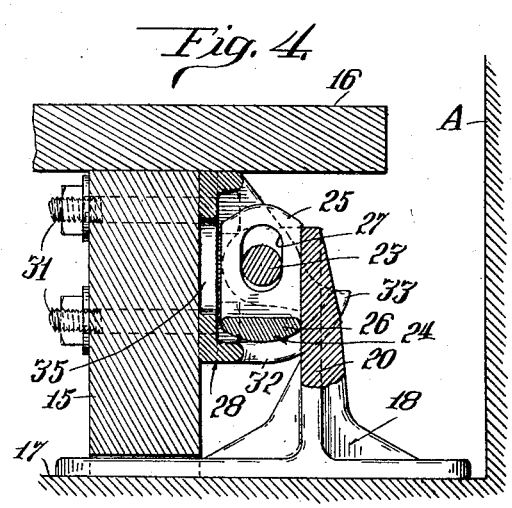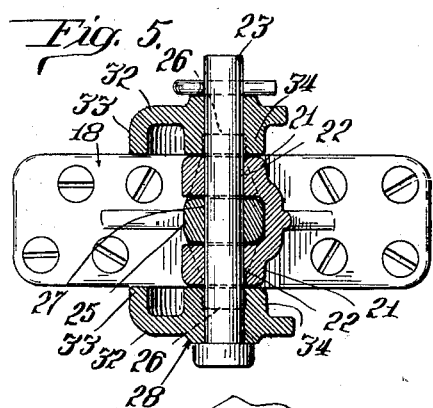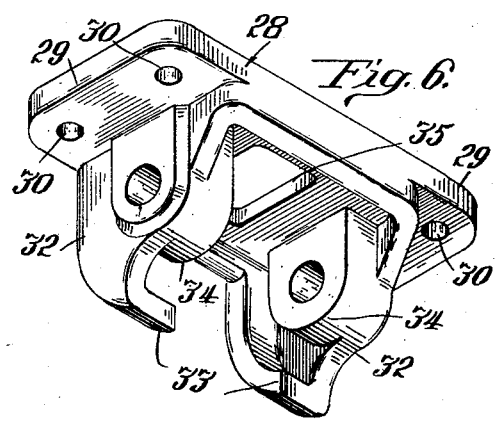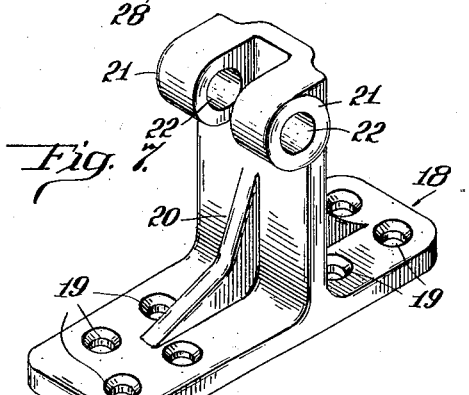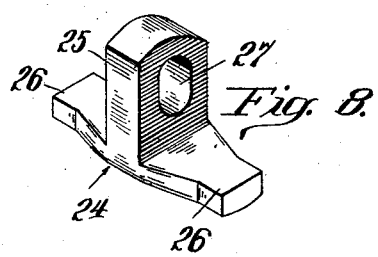

Patented Dec. 8, 1931

1,835,221

UNITED STATES PATENT OFFICE

MALCOLM S. JOHNSON, OF CHICAGO, ILLINOIS, ASSIGNOR TO ILLINOIS RAILWAY EQUIPMENT COMPANY, OF CHICAGO, ILLINOIS, A CORPORATION OF ILLINOIS

FLOOR RACK HINGE

Application filed October 27, 1930. Serial No. 491,371.

My invention relates to a hinge for the floor racks employed in railroad freight cars used during the shipment of commodities requiring proper ventilation or air circulation intermediate of the main car floor and the racks on which the commodities are superposed.

These floor racks, which usually consist of stringers and superposed slats, are generally made in sections arranged intermediate of the side doors of the car and intermediate of side door openings and the end walls of the car on each side of the longitudinal center of the car in order that the respective sections may be easily and separately handled and raised against the side walls of the car for the purpose of cleaning the car.

My invention relates to a hinge whereby the floor rack sections may be hingedly secured to the car floor adjacent to the side walls in a manner which will permit the floor rack sections to be raised substantially parallel with the side walls of the car out of the way.

The invention also involves a self-locking hinge whereby the floor sections will be held in their raised position parallel with the car wall; the locking means being of a nature which will permit it to be easily moved out of locking position by the foot of the operator when it is desired to lower the floor rack sections into proper position on the car floor.

The objects and advantages of my invention will be readily comprehended from the detailed description of the accompanying drawings, wherein—

Figure 3 is a vertical sectional view taken substantially on the line 3—3 of Figure 2.

Figure 4 is a similar view showing the floor rack in lowered position.

Figure 5 is a cross sectional view taken substantially on the line 5—5 of Figure 3, as viewed by the arrows.

Figure 6 is a detail perspective view of the rack-attaching hinge member.

Figure 7 is a detail perspective view of the floor attaching hinge member.

Figure 8 is a perspective view of the locking member of the hinge.

My invention relates to a hinge for permanently securing the floor rack sections to the car floor; it being understood, however, that the invention is not limited to any particular type of freight car as the general features of the invention may be used in any refrigerator car or in any ordinary car employing a supplemental floor or floor rack superposed on the car floor proper.

Floor racks, as at present in use, are made in sections disposed on opposite sides of the longitudinal center line of the car; the sections consisting of a suitable number of stringers 15 of length commensurate with the length of the section desired and these stringers provided with the transversely disposed slats 16 arranged predetermined distances apart in keeping with requirements to permit ventilation of air circulation between the car floor proper indicated at 17 and the slats and therefore beneath the commodities arranged on the floor racks. The stringers 15 are of a predetermined width adapted to rest on the floor proper of the car and to maintain the slats at a proper elevation above the floor, as more clearly shown in Figure 4.

Figure 1:
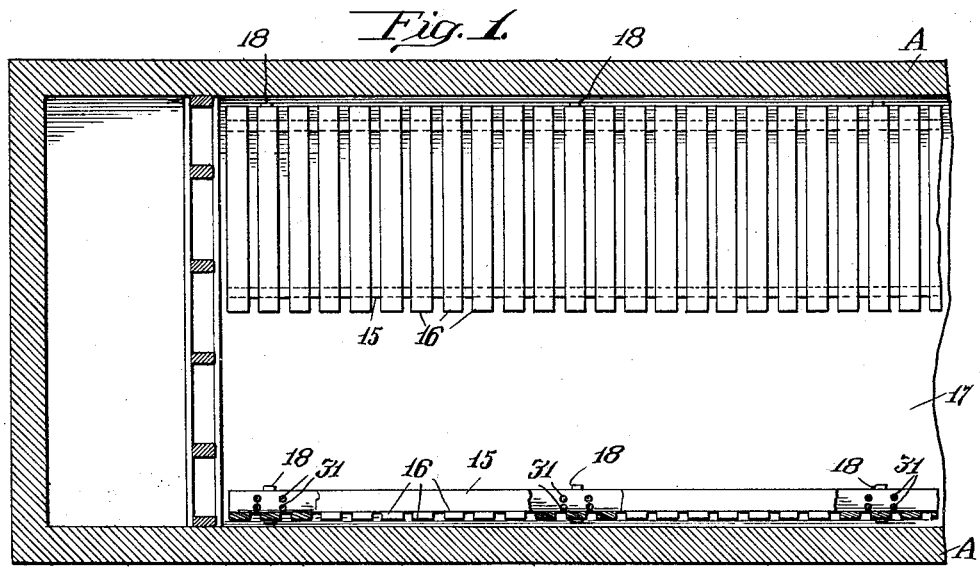
Figure 1 is a sectional plan of a portion of a car and illustrating portions of two sections of the floor rack on opposite sides of the longitudinal center line with one section in lowered position on the car floor, while the opposite section is in raised position against the car wall.
Figure 2:
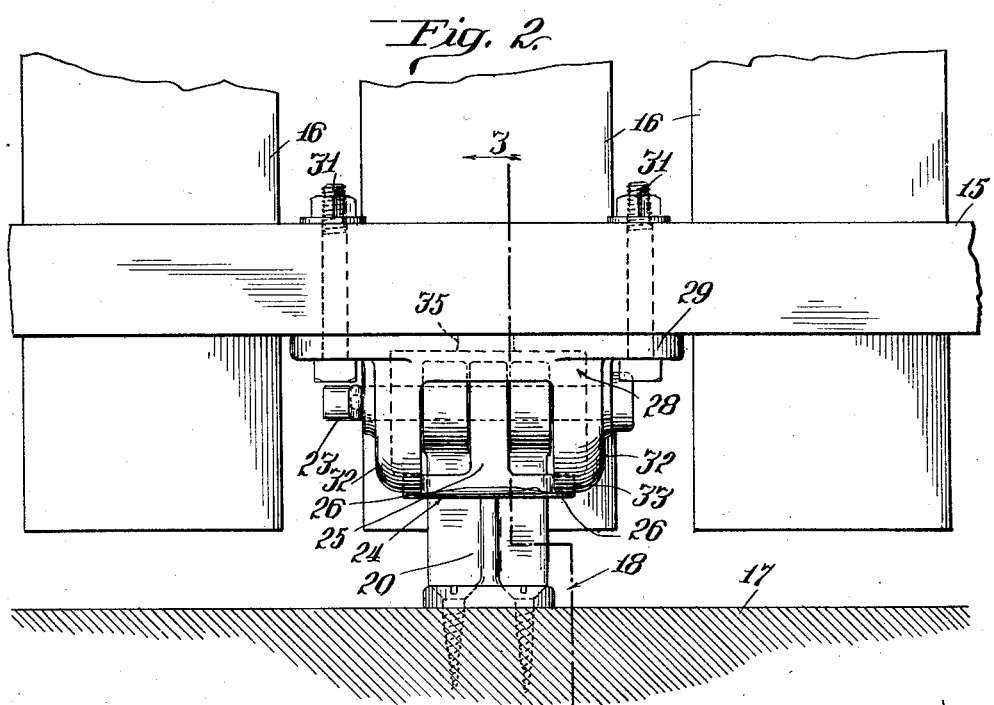
Figure 2 is an enlarged view of a portion of a floor rack as viewed from the lower side of the rack when in raised position; my improved hinge being shown in end elevation.

My improved hinge comprises a base or floor member 18, see Figure 7, having an extended base portion which is adapted to extend parallel with the car floor 17 and be secured thereto by suitable bolts or other fastening means which pass through the various apertures 19 formed in the base portion; the base member being secured to the car floor in proximity to the side wall A of the car, as shown in Figures 1, 3 and 4. The base member is provided with an upstanding portion 20 terminating at top in the horizontally spaced overhanging lobes or ears 21 disposed on one side of the upstanding portion, namely on the side of the upstanding portion away from the car side wall. The lobes or ears 21 are each provided with an opening 22; the openings registering with each other to receive the hinge-pin 23, as shown in Figure 5.

The hinge-pin 23, intermediate of the lobes or ears 21, is provided with a gravity actuated locking member 24 shown in detail in Figure 8. This locking member 24 consists of the vertical stem 25 preferably provided with the upper arcuate end while the lower depending end has the oppositely disposed lugs 26, 26. The vertically disposed portion 25 is provided with a vertically elongated opening 27 through which the hinge-pin 23 extends.

The upper or rack-attaching hinge member 28 is shown in detail in Figure 6 and consists of the flat plate portion 29 having suitable apertures 30 whereby the member 28 is secured to the floor-rack stringer 15 which is disposed adjacent to the side wall of the car; the member 28 being secured to the stringer preferably by means of bolts 31, as shown in Figures 3 and 4.

The member 28, on one of the faces of the plate portion 29, is provided with a pair of depending wing portions 32 preferably arranged substantially flush with one longitudinal side of the plate portion 29 and curving inwardly toward the opposite longitudinal side, as shown in Figure 6. These wing portions 32 are spaced apart a predetermined distance with their inner or opposing sides provided with opposingly disposed flange portions 33 which also are arcuate or curved to provide a downwardly curved slide-way adapted to receive the lugs or ears 26 of the locking member 24 when the latter is in raised position.

The depending wing portions on their inner sides are preferably provided with the enlargements or bosses 34 for the purpose of sufficient strength and also to extend substantially flush with the outer sides of the lobes or ears 21 of member 18 and thus prevent undue lateral play between the hinge members. The wings 32 terminate slightly to one side of the vertical axis of the hinge-pin 23 in order to abut against one longitudinal side of lock member 24, namely in engagement with the slightly tapered sides of the lugs 26 of the lock member when the latter has dropped down out of the arcuate slide-way formed by the wings 32 and their opposing flanges 33.

The upper member or plate 28, intermediate of the wings, is shown provided with an opening 35 to receive the upper end of the stem 25 of the lock member 24 when the latter is elevated or in the raised position occupied when the floor-rack is in lowered position.

The length of the upstanding stem 25 of lock member 24 and the length of the slot 27 are such that when the lock member 24 is in full lowered position, the lugs 26 will be disposed in the path of the lower ends of the wings 32 of the upper hinge member 28 and will be in abutting relation therewith, as shown in Figure 3. As the lock member 24 abuts against the upstanding portion 20 of the lower hinge member 18, it is apparent that the lock member 24 cannot swing on the hinge-pin 23 and therefore the upper hinge member 28 and the floor rack will be held in raised position, namely with the floor rack disposed parallel with the side wall A of the car; the lock member 24 dropping into locking position through the action of gravity when the floor rack is raised. That is to say, the lugs 26 of the lock member 24, ride in the slideway formed by the arcuate flanges 33 during the raising of the floor rack until the lugs 26 reach the ends of the arcuate flanges 33 at which time the lock member 24 will clear the flange 33 and drop downwardly into the position shown in Figure 3, with the ends of the flanges 33 resting against the lugs 26, which will prevent reverse movement of the floor rack.

In order to lower the floor rack into normal position onto the car floor, the operator raises the lock member 24 with his foot so as to clear the lower ends of the wings 32 and then lowers the floor rack, allowing the lugs 26 of the lock member 24 to ride in the arcuate slide-way formed by the flanges 33 of the top or floor rack attaching hinge member 28.

With the extended base of member 18, it is apparent that the pivotal connection between the members 18 and 28 will be sufficiently spaced from the car side wall to permit the floor-rack to swing against the side wall with the ends of the slats intermediate of the upstanding portion 20 and the car sidewall as shown in Figure 3.

With my improved hinge, it is apparent that the use of separate latch or holding means fastened to the car side wall is obviated, while on the other hand a self-locking hinge is provided.

The simplest embodiment of my invention has been shown in the drawings and has been described in terms employed merely as terms of description and not as terms of limitation, as structural modifications are possible and may be made without, however, departing from the spirit of my invention.

What I claim is:

1. A floor-rack hinge comprising a base member provided with an upstanding hinge-pin receiving portion; a floor-rock attaching member provided with spaced apart depending wings having hinge-pin receiving openings; a hinge-pin disposed through said openings and the upstanding portion of the base member; and a gravity actuated lock member mounted on the hinge pin and adapted to engage with the lower ends of said depending wings.

2. A floor-rack hinge comprising a base member provided with an upstanding hinge-pin receiving portion; a floor-rack attaching member having hinge-pin receiving openings and a portion extending from one face thereof; a gravity actuated member adapted to move intermediate of said portion of the rack attaching member and said base member when the former is swung upwardly; and a member whereby the other members are hingedly connected.

3. A floor-rack hinge comprising a base member; a floor-rack attaching member; both members being provided with registering apertured portions; and a loosely mounted member adapted to automatically move intermediate of the first two mentioned members when the second member is moved to raised position.

4. A floor-rack hinge comprising a base member provided with an apertured upstanding portion; a floor-rack attaching member provided with apertures adapted to register with the aperture of the upstanding portion and having a bifurcated portion adapted to straddle said upstanding portion of the base member; and a loosely mounted lock member adapted to automatically move intermediate of said bifurcated portion and said upstanding portion when the second member is swung upwardly.

5. A floor-rack hinge comprising a base member, provided with an upstanding portion terminating in off-set apertured ears; a floor-rack attaching member provided on one face with a pair of spaced apart wings disposed on opposite sides of said ears and apertured to register with said apertured ears, the lower ends of the wings being formed to provide a pocket on opposite sides of said upstanding portion; a hinge-pin disposed through said apertures; and a gravity actuated member loosely mounted intermediate of the ears of the upstanding portion and having a laterally disposed end normally slidable in said pocket, said member being adapted to move out of said pocket into a position intermediate of the lower ends of said wings and said upstanding portion when the second mentioned member is raised.

6. A floor-rack hinge comprising a base member provided with an upstanding portion terminating in overhanging apertured ears; a floor-rack attaching member provided on one face with a pair of spaced apart apertured wings adapted to straddle said upstanding portion and to be pivotally secured thereto; a lock member loosely mounted between the apertured ears of said upstanding portion and provided with laterally disposed lugs adapted to move into engagement with the lower ends of said wings when the second mentioned member has been swung upwardly.

7. A floor-rack hinge comprising a base member provided with an upstanding portion terminating at top in an overhanging apertured end; a floor-rack attaching member provided with spaced apart apertured lobes adapted to straddle the apertured end of said upstanding portion and having spaced apart arcuate wings terminating on one side of the apertured lobes, said wings being each formed to provide an open ended and open sided socket; a hinge-pin disposed through the apertured end of the upstanding portion and through said lobes; and a gravity actuated member loosely mounted on the hinge-pin and having laterally disposed portions normally disposed in the open-sided socket, said member being adapted to drop intermediate of the ends of said wings and said upstanding portion when the second member is swung upwardly.

MALCOLM S. JOHNSON.